(12) United States Patent
Ushinohama (10) Patent No.: US 10,859,960 B2
(45) Date of Patent: Dec. 8, 2020

(54) IMAGE PROCESSING APPARATUS, CONTROL METHOD FOR IMAGE PROCESSING APPARATUS, AND INFORMATION PROCESSING SYSTEM

(71) Applicant: CANON KABUSHIKI KAISHA, Tokyo (JP)

(72) Inventor: Takuya Ushinohama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/538,691

(22) Filed: Aug. 12, 2019

(65) Prior Publication Data

US 2020/0064766 A1 Feb. 27, 2020

(30) Foreign Application Priority Data

Aug. 24, 2018 (JP) .................. 2018-157275

(51) Int. Cl.
*G03G 15/00* (2006.01)
*G06F 3/12* (2006.01)
*G06Q 10/08* (2012.01)

(52) U.S. Cl.
CPC ....... *G03G 15/553* (2013.01); *G03G 15/5016* (2013.01); *G03G 15/5091* (2013.01); *G06F 3/121* (2013.01); *G06F 3/1224* (2013.01); *G06Q 10/087* (2013.01)

(58) Field of Classification Search
CPC ........... G03G 15/5016; G03G 15/5091; G03G 15/121; G03G 15/55; G03G 15/553; G06F 10/00; G06F 3/121; G06F 3/1224; G06F 3/1235; G06F 11/0733; G06Q 10/087; G06Q 10/101; G06Q 10/20; G06Q 30/0633
USPC .............................. 399/9–11, 24–27, 79, 80
See application file for complete search history.

(56) References Cited

U.S. PATENT DOCUMENTS

| 5,335,048 A * | 8/1994 | Takano .................. G03G 15/55 399/24 |
| 8,381,111 B2 * | 2/2013 | Kawana ............. G03G 15/5075 101/494 |

FOREIGN PATENT DOCUMENTS

| JP | 09-188042 A | 7/1997 |
| JP | 2005-165092 A | 6/2005 |
| WO | 2016/158393 A1 | 10/2016 |

\* cited by examiner

*Primary Examiner* — Hoan H Tran
(74) *Attorney, Agent, or Firm* — Canon U.S.A., Inc. I.P. Division (57) ABSTRACT

An image processing apparatus configured to connect with an information management server that manages information relating to a service contracted for the image processing apparatus, includes an acquisition unit configured to acquire, from the information management server, the information relating to the service contracted for the image processing apparatus, and a notification unit configured to perform notification to the information management server in order to activate service setting that has been determined as being invalid by the information management server, of a service contracted for the image processing apparatus, based on the information acquired by the acquisition unit.

16 Claims, 10 Drawing Sheets

| PRINTER ID | SUPPORT SERVICE ACTIVATION STATE | SUPPORT SERVICE PROVIDER NAME | APPLICATION SERVICE ID | APPLICATION SERVICE OVERVIEW | APPLICATION ID | APPLICATION DATE |
|---|---|---|---|---|---|---|
| 123456789 | VALID | XXX | 123AAA | AUTOMATIC CARTRIDGE DELIVERY | abc123 | 2018/03/05 |
| 123456789 | INVALID | ZZZ | 456BBB | JOB MANAGEMENT | efg456 | 2018/03/05 |
| 222222222 | INVALID | XXX | 123AAA | AUTOMATIC CARTRIDGE DELIVERY | xyz789 | 2018/01/23 |
| ... | ... | ... | ... | ... | ... | ... |

308 APPLICATION INFORMATION TABLE

FIG.5

207 SUPPORT SERVICE SETTING TABLE

| SUPPORT SERVICE ACTIVATION SETTING | APPLICATION SERVICE ID | APPLICATION SERVICE OVERVIEW | APPLICATION ID |
|---|---|---|---|
| VALID | 123AAA | AUTOMATIC CARTRIDGE DELIVERY | abc123 |
| INVALID | 456BBB | JOB MANAGEMENT | efg456 |
| INVALID | 789CCC | POWER MANAGEMENT | |

FIG.6

FIG.8

IMAGE PROCESSING APPARATUS, CONTROL METHOD FOR IMAGE PROCESSING APPARATUS, AND INFORMATION PROCESSING SYSTEM

BACKGROUND

Field

The present disclosure relates to an image processing apparatus, a control method for the image processing apparatus and an information processing system. The image processing apparatus is connected to an information management server, and information on contracted service of the image processing apparatus is managed by the information management server.

Description of the Related Art

As an output apparatus for an image processing apparatus, an apparatus such as a word processor, a personal computer, and a facsimile, an image forming apparatus using an electrophotographic method is widely known. The image forming apparatus records desired information (e.g., a character and an image) on a sheet-shaped recording medium (e.g., a paper sheet and a transparent film).

Such an image forming apparatus uses developing agent such as toner and ink to form an image on the recording medium. Thus, it is necessary for a user to purchase and exchange, as needed, consumables such as a cartridge or a developing unit containing the developing agent and a process cartridge in which a charging device, a photoconductor drum, and the developing unit are integrated. In order to reduce user operation relating to the purchase of the consumables, a technique is known that automatically orders the consumables to a predetermined order destination when a remaining amount of the consumables reaches an amount equal to or lower than a predetermined threshold.

Japanese Patent Application Laid-Open No. H09-188042 discusses a configuration in which, when it is detected that a remaining amount of consumables such as toner becomes equal to or lower than a set value, a predetermined format and information relating to a user that are previously stored in an image forming apparatus are transmitted to an order destination that is previously stored. Thus, the configuration reduces a time and effort required of the user to perform ordering the consumables such as creation of an order form and communication with a service center, for example.

Japanese Patent Application Laid-Open No. 2005-165092 discusses an automatic consumable ordering system that includes an image forming apparatus and a management server both connected to a common network. In this system, the management server receives a consumable ordering instruction issued from the image processing apparatus, and the management server orders the consumables from a manufacturer or a service center.

The above-described techniques are meant to order the consumables from a predetermined service providing source such as a manufacturer and a service center, and changing the order destination for the consumables to a service providing source other than the above-described predetermined order destination is not considered.

Accordingly, in a case where an administrator of the image processing apparatus changes the order destination for the consumables to another desired service providing source while the administrator is under service contract with a plurality of service providing sources, changing the order destination may require a user to expend time and effort.

Further, in order to change the order destination to use the service, it is necessary to check whether the administrator is under contract for a service with a new order destination. If the order destination is changed without the check, an order instruction may be issued to a service providing source that is not under service contract or that is in a state of contract cancellation.

Further, even if the administrator of the image forming apparatus is under service contract with the order destination, the administrator may erroneously select a service for automatically ordering consumables that cannot be used by the image forming apparatus of an order source.

SUMMARY

According to various embodiments of the present disclosure, an image processing apparatus configured to connect with an information management server that manages information relating to a service contracted for the image processing apparatus, includes an acquisition unit configured to acquire, from the information management server, the information relating to the service contracted for the image processing apparatus, and a notification unit configured to perform notification to the information management server in order to activate service setting that has been determined as being invalid by the information management server, of a service contracted for the image processing apparatus, based on the information acquired by the acquisition unit.

Further features will become apparent from the following description of exemplary embodiments with reference to the attached drawings.

DESCRIPTION OF THE EMBODIMENTS

Some exemplary embodiments of the present disclosure are described in detail below with reference to drawings.

In the exemplary embodiments, a multifunctional peripheral (MFP) including a printing function, a scanning function, and a fax function is described as an example of an image processing apparatus.

The following exemplary embodiments do not limit the scope of the invention defined by the appended claims, and all of combinations of features described in the exemplary embodiments are not necessarily essential for solutions encompassed by the present disclosure.

Figure 1:
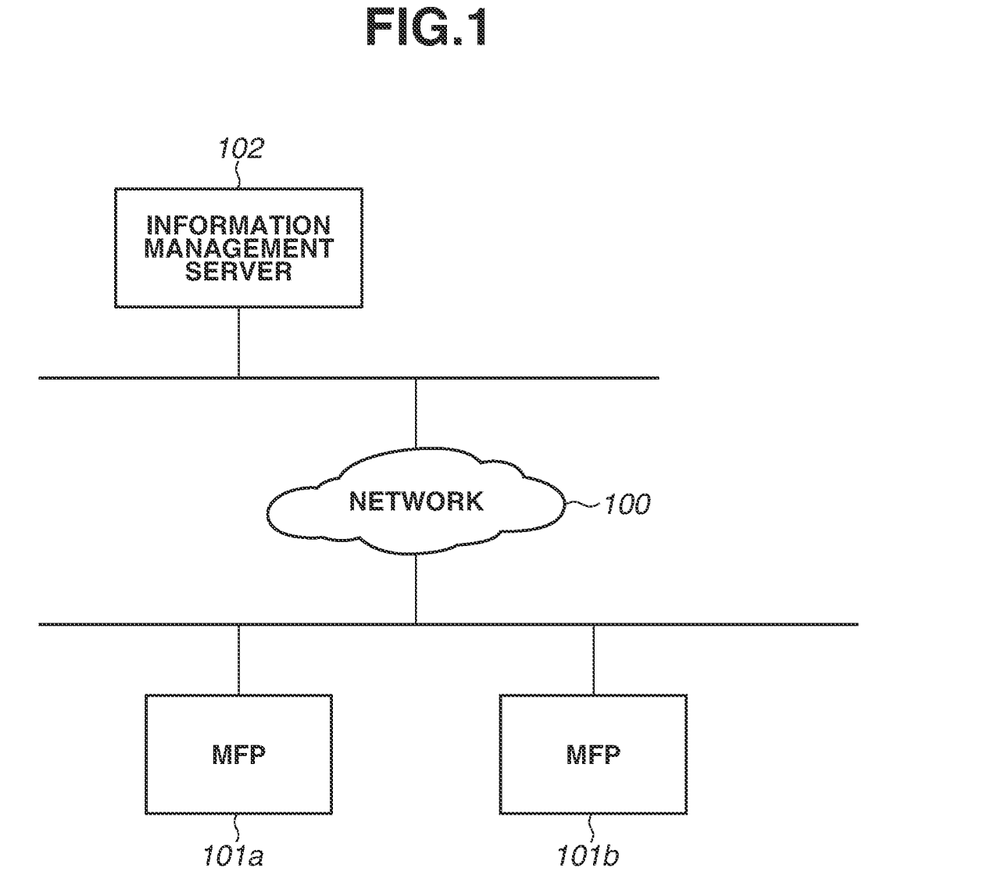
FIG. 1 is a block diagram illustrating an entire configuration of a system.

FIG. 1 is a block diagram illustrating an image processing system according to a first exemplary embodiment. An MFP 101a, an MFP 101b, and an information management server 102 are communicably connected via a network 100. The MFP 101a and the MFP 101b may be the same models or different models.

In the following description, the MFP 101a is described as an MFP 101.

The information management server 102 is installed with application information management service that manages support service application information on the MFP 101 as a client and information with which various kinds of service information and information relating to a device of the MFP 101 are associated. In the present exemplary embodiment, the information management server 102 provides a cloud service achieved by a plurality of servers. The information management server 102 may include a single server machine or a plurality of servers, and the number is not limited in the present exemplary embodiment. Further, the MFP 101 and the information management server 102 can be on the same network.

Figure 2:
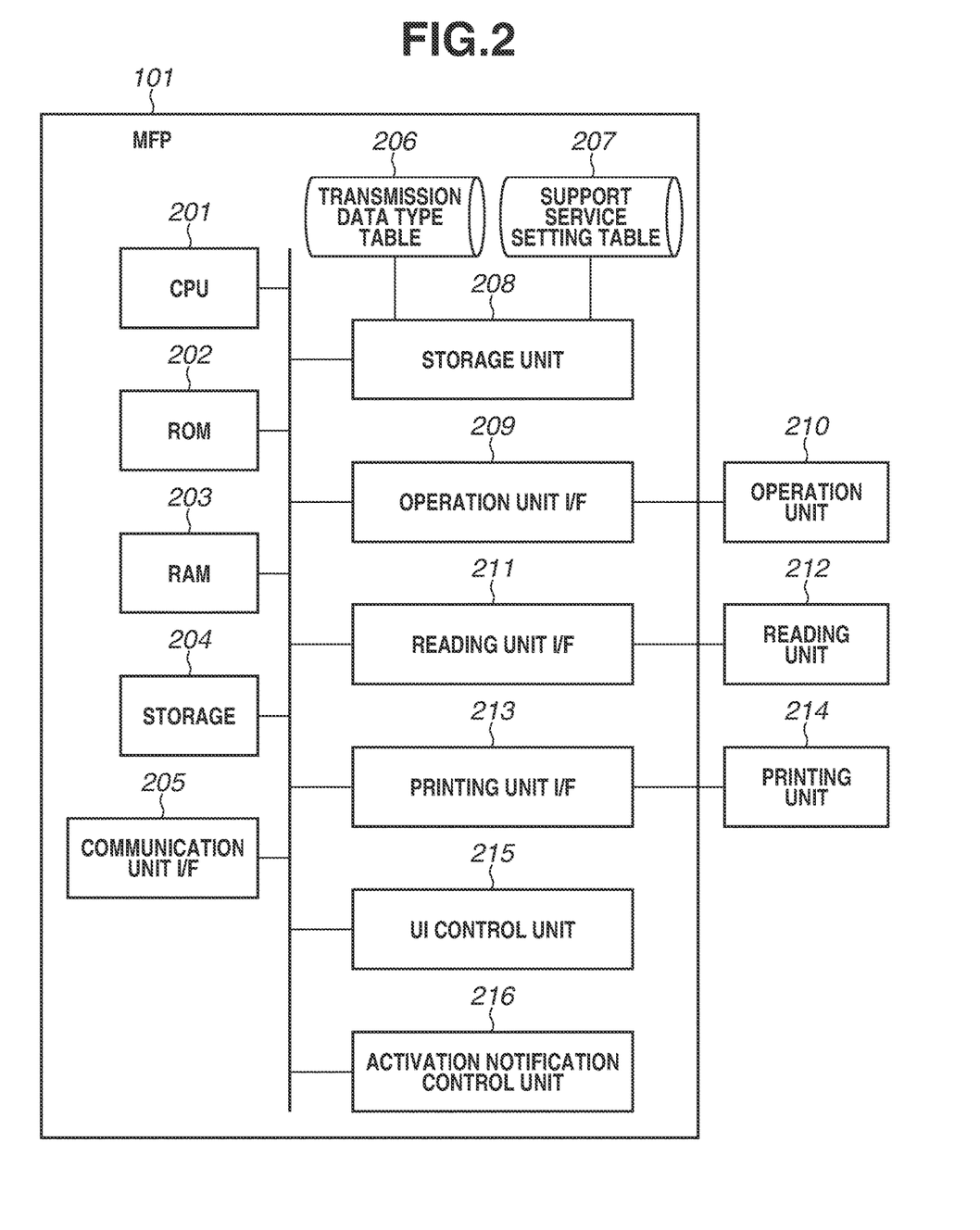
FIG. 2 is a block diagram illustrating a configuration of a multifunctional peripheral (MFP).

FIG. 2 is a block diagram illustrating a configuration of the MFP 101 according to the present exemplary embodiment. The MFP 101 includes a reading function to read an image on a sheet, and a printing function to print an image on a sheet. The MFP 101 further includes a file transmission function to transmit image data to an external apparatus.

In the present exemplary embodiment, the MFP 101 is described as an image processing apparatus. However, the image processing apparatus is not limited thereto. As the image processing apparatus, for example, a printing apparatus such as a printer not including a reading function may be used. Alternatively, an image reading apparatus such as a scanner not including the printing function may be used.

A central processing unit (CPU) 201 controls operation of the entire MFP 101. The CPU 201 reads a control program stored in a read-only memory (ROM) 202 or a storage 204, to perform various kinds of control such as reading control and printing control. The ROM 202 stores the control program executable by the CPU 201. A random access memory (RAM) 203 is a main storage memory for the CPU 201, and is used as a work area or a temporary storage area to develop various kinds of control programs stored in the ROM 202 and the storage 204. The storage 204 stores print data, image data, various kinds of programs, and various kinds of setting information. In the MFP 101 according to the present exemplary embodiment, one CPU 201 executes processing illustrated in a flowchart described below with use of one memory (RAM 203). However, the configuration is not limited thereto. For example, a plurality of CPUs, RAMs, ROMS, and storages may cooperate with one another to execute the processing illustrated in the flowchart described below. Further, a hardware circuit such as an application specific integrated circuit (ASIC) and/or a field-programmable gate array (FPGA) may be used to execute a part of the processing.

A storage unit 208 stores designated data in the ROM 202, the RAM 203 and the storage 204, or reads the stored data therein, in response to an instruction from another function unit. In the present exemplary embodiment, the storage unit 208 refers to a transmission data type table 206 and a support service setting table 207 stored in the storage 204 of the MFP 101.

An operation unit interface (I/F) 209 is connected to an operation unit 210. A reading unit I/F 211 is connected to a reading unit 212. The reading unit 212 reads an image on a sheet to generate image data. The image data generated by the reading unit 212 is transmitted to an external apparatus. Alternatively, an image is printed on a sheet based on the image data. Further, the reading unit 212 can read sheets placed on a document feeder (not illustrated) one by one while conveying each sheet.

A printing unit I/F 213 is connected to a printing unit 214. Image data to be printed is transferred to the printing unit 214 via the printing unit I/F 213. The printing unit 214 receives a control command and the image data to be printed, and prints an image based on the image data on a sheet. A printing method used in the printing unit 214 may be an electrophotographic method or an inkjet method. In a case of the electrophotographic method, an electrostatic latent image is formed on a photoconductor and is then developed with toner to form a toner image. The toner image is transferred to a sheet, and the transferred toner image is fixed to form an image. In a case of the inkjet method, ink is ejected to print the image on a sheet. Consumables such as a toner cartridge and an ink cartridge used by the printing unit 214 for printing are detachably mounted inside the MFP 101. A user can supply the consumables to the MFP 101 by replacing the cartridge. The CPU 201 acquires a remaining amount of the consumables necessary for printing at periodical timing, at timing that an image of one page is printed, or at timing that the cartridge is mounted. The acquired remaining amount of the consumables is stored in the RAM 203. The CPU 201 stores a model number of the cartridge in the RAM 203 or in the storage 204 when the cartridge is mounted.

The MFP 101 is connected to the network 100 via a communication unit I/F 205. The communication unit I/F 205 acquires application support service information of the MFP 101 from the information management server 102 on the network 100. Further, the communication unit I/F 205 receives print data and information from a personal computer (PC) on the network 100, or transmits information relating to the consumables such as the toner remaining amount and the model number of the cartridge stored in the RAM 203 or in the storage 204.

The print data received through the communication unit I/F 205 is analyzed by a software module (e.g., page description language (PDL) analysis unit) (not illustrated) that analyzes the print data stored in the storage 204 or in the ROM 202. The PDL analysis unit generates data to be used for printing by the printing unit 214, based on the print data expressed in various kinds of PDLs.

A user interface (UI) control unit 215 controls the operation unit 210 via the operation unit I/F 209. Specifically, the UI control unit 215 displays, for example, user notification and option information on the operation unit 210 and receives operation performed on the operation unit 210 by the user, and notifies contents of the operation to another function unit.

An activation notification control unit 216 determines whether to transmit activation notification, which is used to activate or deactivate a support service function, to the information management server 102, based on information in the support service setting table 207 read by the storage unit 208.

Figure 3:
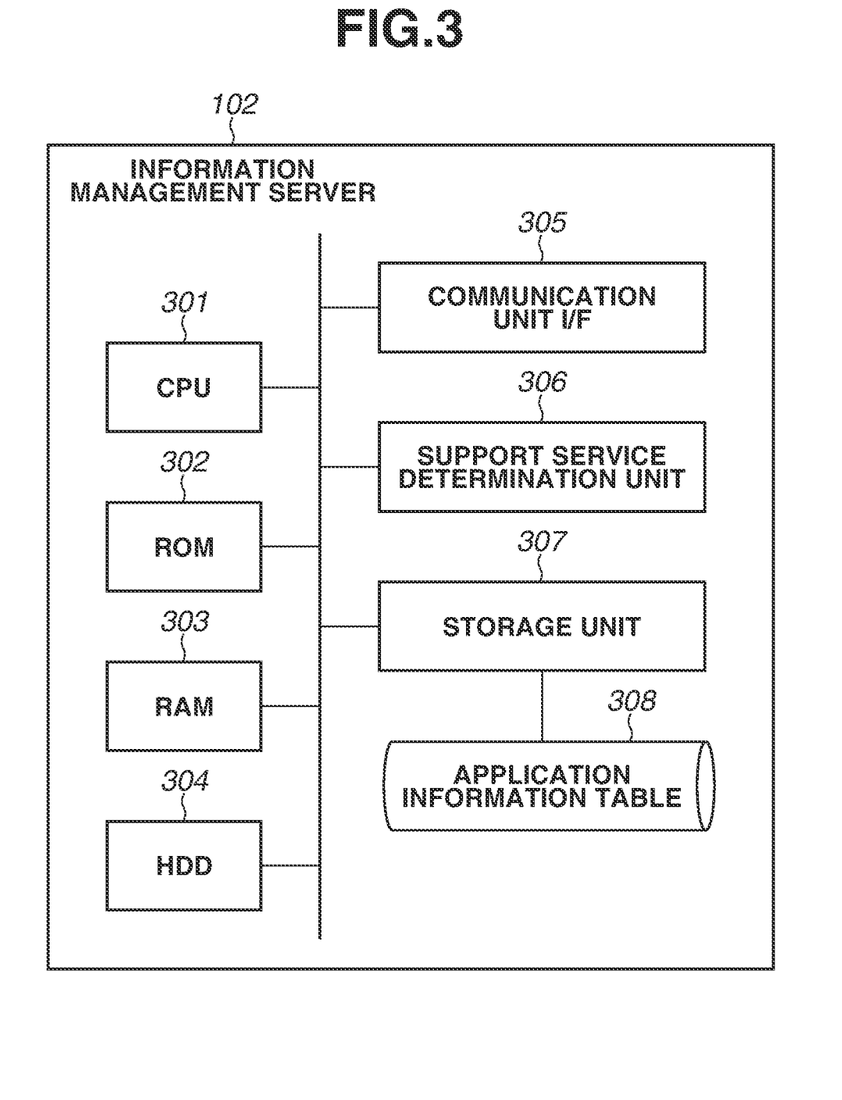
FIG. 3 is a block diagram illustrating a configuration of an information management server.

FIG. 3 is a block diagram illustrating a configuration of the information management server 102 according to the present exemplary embodiment.

The information management server 102 includes a CPU 301, a ROM 302, a RAM 303, and a hard disk drive (HDD) 304. The information management server 102 further includes a communication unit I/F 305, and these units are communicably connected to one another via a data bus. The CPU 301 includes a calculation circuit and entirely controls the information management server 102. The CPU 301 reads a program stored in the ROM 302 or in the HDD 304, stores the program into the RAM 303, and executes various processing. The ROM 302 stores, for example, a system program to be used for control of the information management server 102. The HDD 304 has a function as a storage area, and stores, for example, application programs for executing various processing. The HDD 304 is an example of a storage device, and a solid-state drive (SSD) and the like other than the HDD can also be used. The communication unit I/F 305 communicates with, for example, the MFP 101 through the network 100 under the control of the CPU 301.

A storage unit 307 stores designated data in the ROM 302, the RAM 303, and the HDD 304, or reads the stored data therein, in response to an instruction from another function unit. In the present exemplary embodiment, the storage unit 307 refers to an application information table 308 stored in the HDD 304 of the information management server 102.

A support service determination unit 306 determines whether the MFP 101 has applied for support service requiring application, based on information in the application information table 308 read by the storage unit 307.

Figure 4:
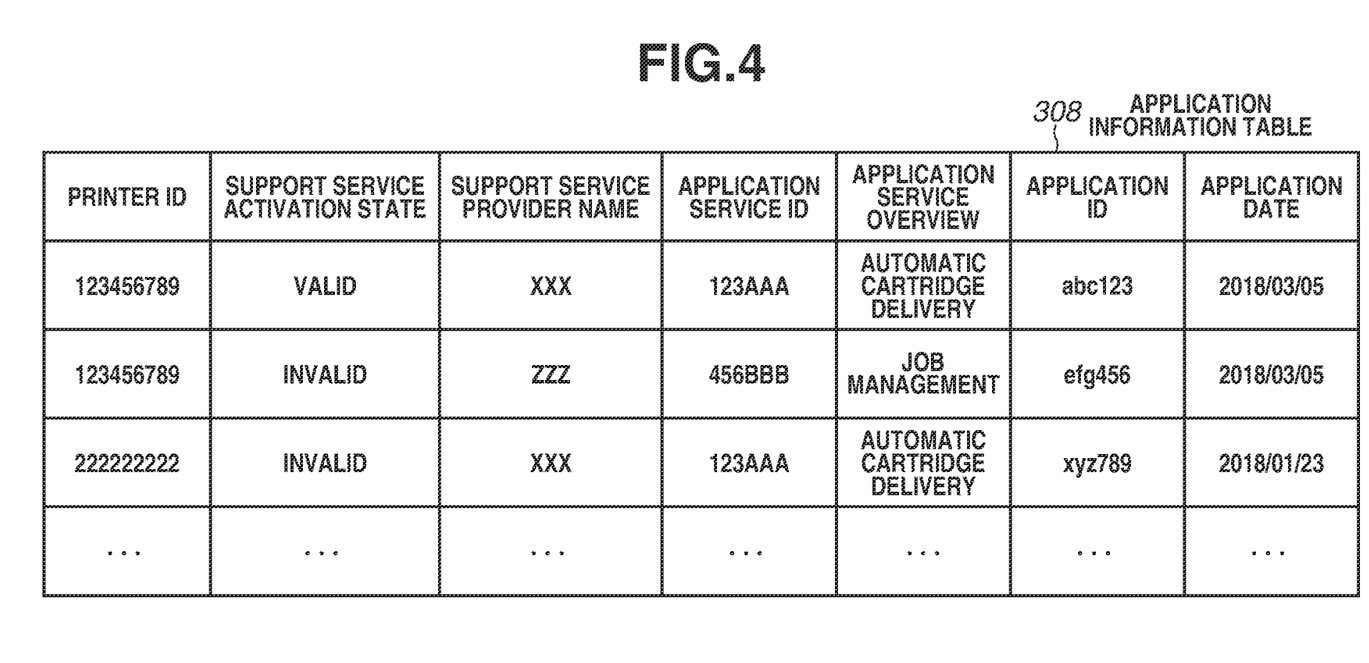
FIG. 4 illustrates an application information table according to first and second exemplary embodiments.

FIG. 4 is a diagram illustrating an example of the application information table 308 according to the present exemplary embodiment. The table is stored in the storage unit 307 of the information management server 102. The application information table 308 stores a printer identifier (ID) and support service management information that are associated with each other. The printer ID is information relating to the device of the MFP 101 and allows for unique identification of the MFP 101. The support service management information includes, for example, a support service activation state indicating an activation state of the support service, a support service provider name, and application information that includes an application service ID, application service overview, an application ID, and an application date. In a case where a printer is under contract with no support service, no support service management information is associated with the printer ID. In a case where one printer is under contract with a plurality of support services, a plurality of pieces of support service management information is associated with the printer ID.

The support service in the present exemplary embodiment is a service that requires a contract between a support service provider (i.e., service providing source) such as a retailer and an administrator of the MFP 101. Examples of the service include automatic consumables delivery service. This is the service in which, when it is detected that a remaining amount of the consumables used in the MFP 101 is equal to or lower than a threshold, the consumables are automatically ordered from the service providing source, and the consumables are delivered based on the order. Examples of the service further include a maintenance service for monitoring the state of the MFP 101 from a remote place and performing maintenance of the MFP 101, and a device management service for reporting a usage state of the device.

When the support service provider and the administrator of the MFP 101 conclude the contract, a printer ID of a printer that has been applied to the service and the support service management information corresponding to the printer having the printer ID are written in the application information table 308. In a case where support service management information is newly written, the support service activation state is invalid, and the support service is activated in response to activation notification from the MFP 101. In a case where the contract is cancelled, the support service management information corresponding to the support service, the contract of which has been cancelled, is deleted from the application information table 308. As described above, the application information table 308 is a table to manage the information on the contract between the user and the support service.

In the example of the application information table 308 illustrated in FIG. 4, there are two pieces of support service management information corresponding to a printer ID "123456789". This indicates that the MFP 101 having the printer ID "123456789" is under contract with two support services. The activation state of the support service corresponding to the application service ID "123AAA" is valid, which indicates that the support service is currently provided. In contrast, the activation state of the support service corresponding to the application service ID "456BBB" is invalid, which indicates that provision of the service is stopped even though the contract has been concluded.

When the MFP 101 requests notification of information indicating whether the MFP 101 has concluded the contract with the support service, the information management server 102 searches the application information table 308 with use of the printer ID assigned to the MFP 101, and notifies a result.

Figure 5:
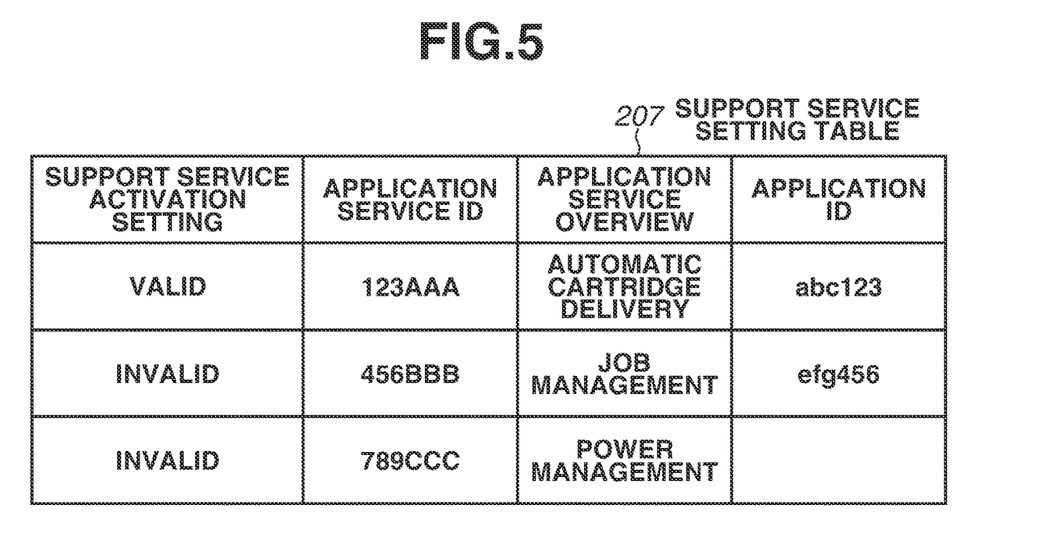
FIG. 5 illustrates a support service setting table according to the first and second exemplary embodiments.

FIG. 5 is a diagram illustrating an example of the support service setting table 207 according to the present exemplary embodiment. The support service setting table 207 is stored in the storage unit 208 of the MFP 101. The support service setting table 207 stores the support service activation setting and the application information that includes the application service ID, the application service overview, and the application ID, in association with each other. The application information that includes the application service ID, the application service overview, and the application ID is information acquired when the MFP 101 requests the information indicating whether the MFP 101 has concluded the contract with the support service to the information management server 102. The support service activation setting is setting indicating whether the function of the support service corresponding to each application information is valid or invalid in the MFP 101. The support service activation setting can be changed to a valid state or an invalid state by various methods. When the contract has been concluded but the support service activation setting is invalid, the service is not provided. In the present exemplary embodiment, the application service ID, the application service overview, and the application ID are acquired from the information management server 102. However, the application service ID and the application service overview may be previously registered in the MFP 101.

In order to activate the invalid support service and to receive the support service, there is the following method.

The setting can be changed in response to, for example, operation by the user through the operation unit 210, operation by a serviceman in a serviceman mode, and reception of an instruction command to the MFP 101 transmitted from outside. The support service also can be deactivated in a similar manner. A normal user may operate the operation unit 210 of the MFP 101 to activate or deactivate each service.

The application ID may become empty in a case where the contract of the corresponding support service is in the cancelled state.

Figure 6:
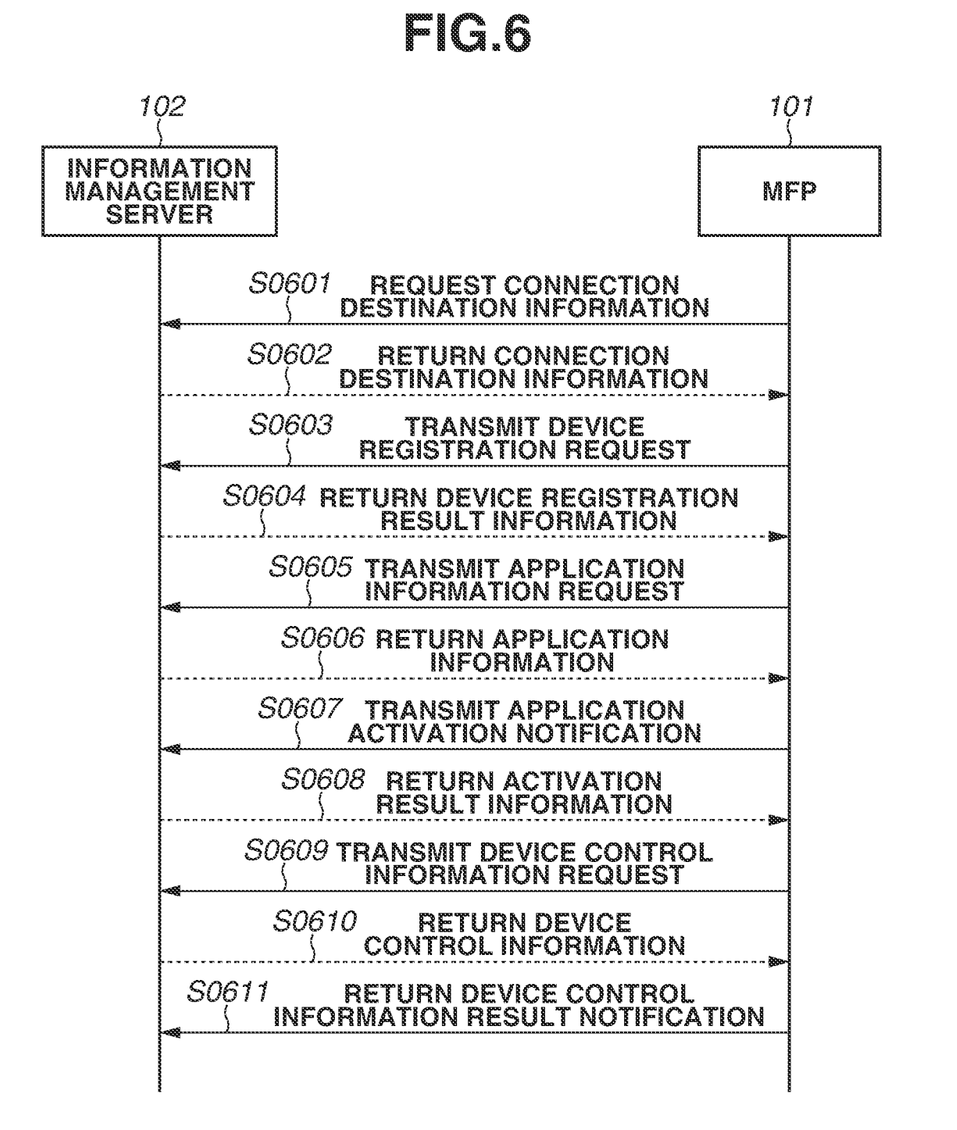
FIG. 6 illustrates a sequence for registration in the information management server according to the first exemplary embodiment.

FIG. 6 is a sequence diagram when the information relating to the MFP 101 is registered in the information management server 102 from the MFP 101. In a case where the MFP 101 receives the support service, activation notification is transmitted in order to register the information relating to the MFP 101 in the information management server 102 and to activate provision of the support service. In this case, the application service IDs and the application service overviews of three services illustrated in FIG. 5 have been registered in the support service setting table 207 in the storage unit 208 of the MFP 101. When the serviceman activates or deactivates the automatic cartridge delivery service, the following processing is started. Alternatively, the following processing may be started when the user activates or deactivates a support service.

When the MFP 101 receives operation to connect the information management server 102, the information management server 102 receives, in step S0601, request for connection destination information. As a response to the request for the connection destination information sent in step S0601, the information management server 102 returns, in step S0602, the connection destination information to the MFP 101. The operation to connect the information management server 102 is performed through, for example, operation of the operation unit 210 by the user to agree transmission of the information to the information management server 102, operation to start connection by the serviceman, or reception of the connection instruction command to the MFP 101 transmitted from outside. In the present exemplary embodiment, the request for the connection destination information transmitted from MFP 101 in step S0601 includes information relating to an installation district of the MFP 101. In step S0602, region information (i.e., connection destination information) is returned to the MFP 101.

In step S0603, the MFP 101 transmits device registration request to the information management server 102. The device registration request includes information for uniquely specifying a device individual such as a device serial number, a trade name, a shipping destination, and time zone information and information for specifying a type of the device. In step S0603, when receiving the device registration request, the information management server 102 returns, in step S0604, device registration result information including the printer ID of the device.

In step S0605, the MFP 101 transmits application information request to the information management server 102. In step S0605, when receiving the application information request, the information management server 102 returns, in step S0606, the application information associated with the printer ID of the MFP 101. There is a case where no application information is associated with the printer ID of the MFP 101 or a plurality of pieces of application information is associated with the printer ID of the MFP 101. The MFP 101 acquires, in step S0606, the application information transmitted from the information management server 102, and updates the information in the support service setting table 207. The information to be stored in the support service setting table 207 may be a part of the application information as long as the information allows for unique identification of the support service in the MFP 101. In the present exemplary embodiment, in step S0606, the MFP 101 acquires the application service ID, the application service overview, and the application ID all associated with the printer ID of the MFP 101 to be connected. As for the application service ID already stored in the support service setting table 207, the information on the application service overview and the application ID is updated with the acquired information. As for the support service of the application service ID not stored in the support service setting table 207, the application service ID, the application service overview, and the application ID are registered in the support service setting table 207 using the acquired application information.

The support service setting table 207 is a table as illustrated in FIG. 5. The support service setting table 207 associates the support service activation setting indicating whether to activate provision of each of one or more support services in the MFP 101, with one or more pieces of application information received by the MFP 101 in step S0606. The support service activation setting is initially set invalid. When the serviceman or the user changes setting to a valid state, the support service activation setting in the support service setting table 207 is updated.

In step S0607, the activation notification control unit 216 of the MFP 101 transmits the activation notification to the information management server 102 based on the application information transmitted from the information management server 102 and the support service activation setting in the support service setting table 207.

The processing by the activation notification control unit 216 in step S0607 is specifically described.

The activation notification control unit 216 determines whether the application ID of the support service is empty, where the support service activation setting in the support service setting table 207 has been set to be valid. In a case where it is determined that the application ID of the support service set to be valid is not empty, namely, the contract of the support service has not been cancelled, the activation notification control unit 216 transmits the application activation notification to the information management server 102 in step S0607. In a case where it is determined that the application ID is empty, the activation notification control unit 216 does not transmit the activation notification to the information management server 102. Alternatively, the activation notification control unit 216 may determine whether to transmit the activation notification further based on determination whether the service provided by the support service matches with the MFP 101 with use of information such as the application service overview. For example, activation notification of the support service for automatically delivering consumables that cannot be used by the MFP 101 (i.e., a service that is not matched with MFP 101), is not transmitted.

The activation notification transmitted in step S0607 includes identification information such as the application ID for uniquely determining the support service to be activated. In FIG. 6, the activation notification of the support service corresponding to an application ID "abc123" is transmitted to the information management server 102, in a case where the support service state in the support service setting table 207 is valid and the application ID is not empty. The information management server 102 set the activation state of the support service to the invalid state, where the support service is associated with the notified printer ID and activation notification has not been transmitted in step S0607.

When receiving the activation notification from the MFP 101, the information management server 102 sets, to the valid state, the activation state of the support service in the application information table 308 corresponding to the identification information included in the activation notification. In step S0608, the information management server 102 sets the activation state of the application information table 308 to the valid state, and returns the activation result information to the MFP 101.

In step S0607, the information management server 102 receives the activation notification from the MFP 101, and starts communication necessary for providing the service with the support service providing source such as a retailer.

By the steps described above, the setting enabling the information management server 102 to provide the service to the MFP 101 is activated.

In step S0609, the MFP 101 further transmits device control information request to the information management server 102. The device control information is to be necessarily transmitted from the MFP 101 to the information management server 102 in order to enable the user to use the activated support service.

When receiving the device control information request, the information management server 102 returns the device control information in step S0610. The device control information includes a transmission data type (hereinafter, requested data type) which the information management server 102 desires of the MFP 101. The requested data type indicates a type of information on the MFP 101 (i.e., device state information) that is necessary for the MFP 101 to receive the currently activated support service. For example, in the case of the automatic cartridge delivery service, the requested data type corresponds to data relating to the cartridge such as a cartridge type, a remaining amount, and a color of the cartridge. The data is not limited thereto, and necessary data may be determined by an optional method. Further, the transmission data type of the MFP 101 (hereinafter, current data type) recognized by the information management server 102 and difference information of the MFP 101 are also included in the device control information. When receiving the device control information, the MFP 101 changes the transmission data type table 206 based on the requested data type. Subsequently, in step S0611, the MFP 101 returns the current data type as the device control information result notification to the information management server 102 based on the state of the changed transmission data type table 206.

By the steps described above, the MFP 101 starts transmission of the device information (i.e., device state information) to the information management server 102 based on the data type stored in the transmission data type table 206. The device state information may be transmitted to the information management server 102 at predetermined timing that an event predetermined for each data type occurs, or at periodical timing after a predetermined time has elapsed. In the case of the data relating to the cartridge, specific example of the event timing includes timing that the toner is consumed by printing or the like, timing that the remaining amount of the toner becomes lower than a predetermined threshold, and timing that the cartridge is attached or detached.

As a result, to receive the service, the MFP 101 can selectively transmit the information relating to the service to be provided among the information on the MFP 101, to the information management server 102.

The information transmitted in the application information and the device control request information from the information management server 102 is changed based on, for example, contract conclusion or contract cancellation of the support service, termination of the support service, and change of a specification. Accordingly, it is necessary for the MFP 101 to periodically acquire information from the information management server 102.

The sequence illustrated in FIG. 6 is executed when the support service activation setting is set to be valid in the MFP 101.

The sequence, however, needs to be periodically executed even other than at the above-described timing.

The execution is carried out to prevent asynchronization between the information management server 102 and the MFP 101 due to change of the support service information in the information management server 102 or change of the apparatus state in the MFP 101. Periodically executing the sequence allows for synchronization between the MFP 101 and the information management server 102.

For example, it is assumed that the user operates the operation unit 210 of the MFP 101 to activate a support service, and then concludes a contract with a providing source that provides the support service. At this time, the activation notification of the service is not transmitted and use of the service is not started at timing that the user operates the operation unit 210 to activate the support service. In a case where the user thereafter concludes the contract with the service providing source, however, it is necessary for the MFP 101 to transmit the activation notification. Even after the sequence illustrated in FIG. 6 ends, the MFP 101 can start use of the service by acquiring the information stored in the application table from the information management server 102 and transmitting the activation notification.

There is also a case where the user cancels the contract with the service providing source while the setting in the MFP 101 is activated. Also in this case, even after the sequence illustrated in FIG. 6 ends, the MFP 101 can stop use of the cancelled service by acquiring the information stored in the application table from the information management server 102. This makes it possible to terminate use of the service even if the user does not operate the operation unit 210 of the MFP 101 to deactivate the service.

Figure 7:
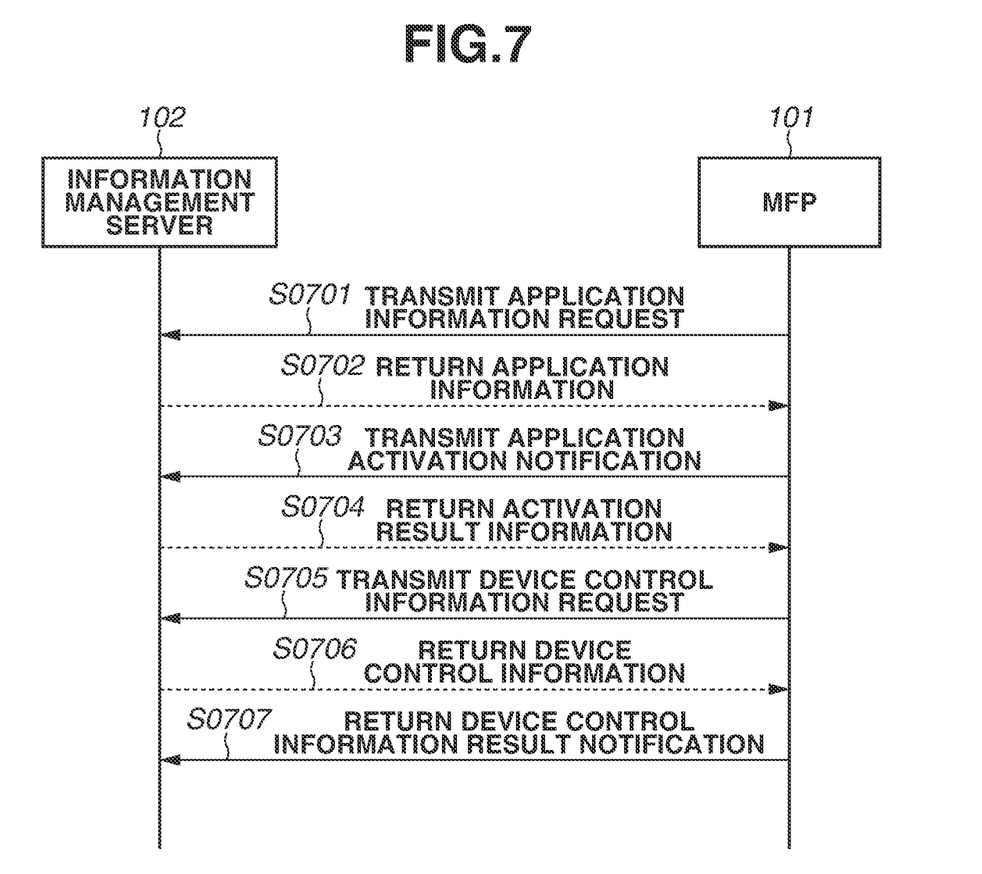
FIG. 7 illustrates a sequence to acquire an application state and device control information by periodic synchronization.

In the present exemplary embodiment, the MFP 101 executes a sequence illustrated in FIG. 7 at the time of startup (i.e., when power is turned on) and every 24 hours from power-on.

At this time, in steps S0701, S0702, S0703, S0704, S0705, S0706, and S0707, the information management server 102 and the MFP 101 perform processing similar to the processing in steps S0605, S0606, S0607, S0608, S0609, S0610, and S0611, respectively.

The processing in steps S0701 to S0707 are not necessarily performed continuously. Execution timing of the sequence illustrated in FIG. 7 is not limited in the present exemplary embodiment, and the sequence may be executed at predetermined timing. The sequence illustrated in FIG. 7 is executed at the time of power-on and every 24 hours from the power-on in the above description. Alternatively, the processing described in FIG. 7 may be executed every predetermined time (e.g., 24 hours) after the user operates the operation unit 210 to activate the service.

Figure 8:
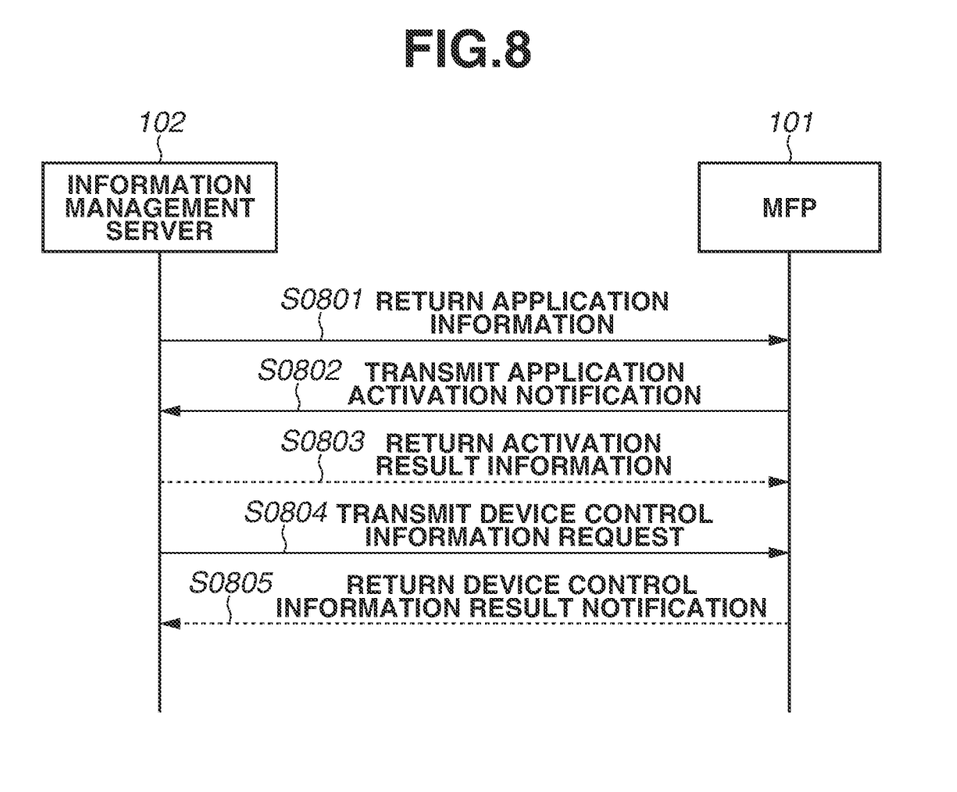
FIG. 8 illustrates a sequence to acquire the application state and the device control information by push notification.

As illustrated in FIG. 8, the support service setting table 207 may be updated and the information on the activation notification may be updated based on change of the information in the information management server 102. In FIG. 8, the processing starts in such a manner that update of the information management server 102 is notified through a push notification. In other words, the information management server 102 may transmit the application information to the MFP 101 at any timing without receiving the request from the MFP 101.

Figure 10:
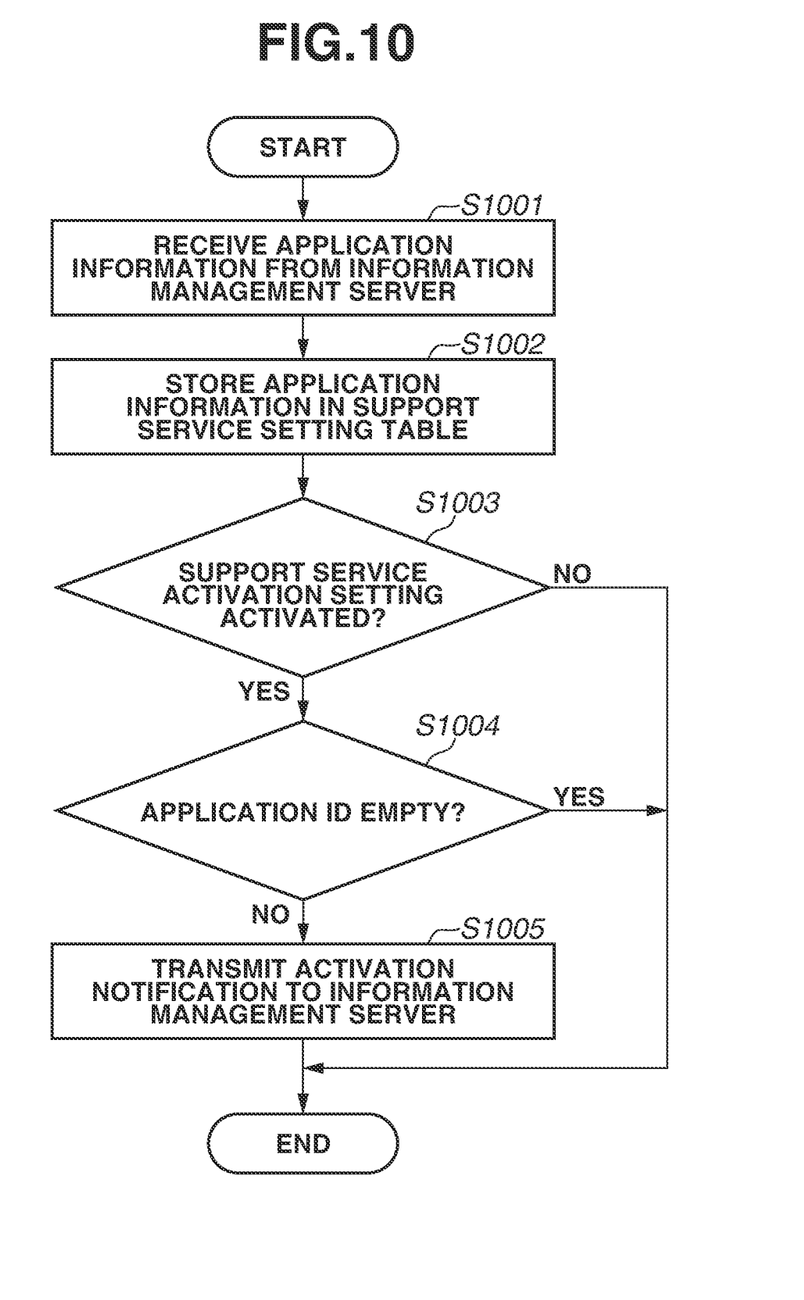
FIG. 10 is a flowchart to determine whether an activation notification control unit performs activation notification.

FIG. 10 is a flowchart illustrating determination whether the activation notification control unit 216 transmits the activation notification. The processing described in the flowchart is processing performed in steps S0606 and S0607 illustrated in FIG. 6, in steps S0702 and S0703 illustrated in FIG. 7, and in steps S0801 and S0802 illustrated in FIG. 8. The steps in the flowchart are executed when the program stored in the ROM 202 or the storage unit 208 of the MFP 101 is read out to be loaded into the RAM 203 and is then executed by the CPU 201.

In step S1001, the MFP 101 receives the application information transmitted from the information management server 102. The information received by the MFP 101 in step S1001 is the support service contract information corresponding to the printer ID of the MFP 101 included in the application information table 308 illustrated in FIG. 4. In a case where there is a plurality of support services corresponding to the printer ID of the MFP 101, the MFP 101 receives a plurality of pieces of support service contract information. In step S1002, the MFP 101 stores the application information received from the information management server 102 into the support service setting table 207 of the storage unit 208. Accordingly, information on the application ID, the application service overview, and the application ID in the support service setting table 207 is updated. In step S1003, the activation notification control unit 216 determines whether the support service activation setting for the support service stored in the support service setting table 207 has been activated. In a case where it is determined that the support service has been activated (YES in step S1003), the processing proceeds to step S1004. In step S1004, the activation notification control unit 216 determines whether the application ID of the support service determined to be activated in step S1003 is empty in the support service setting table 207. In a case where it is determined that the application ID of the support service is not empty (NO in step S1004), the processing proceeds to step S1005. In step S1005, the MFP 101 transmits the activation notification to the information management server 102 in order to activate the function of the support service. In a case where the application IDs of all of the support services in the support service setting table 207 are empty (NO in step S1003), the processing illustrated in FIG. 10 ends. In the present exemplary embodiment, the processing illustrated in FIG. 10 ends in the case where the application IDs of all of the support service are empty. In the case where the application IDs of all of the support service are empty, the MFP 101 may transmit notification to the information management server 102 indicating that no support service is activated.

The flowchart enables the information management server 102 to activate only the support service that has been activated in the MFP 101 and is under contract concluded by the user.

The providing source of the support service desired by the administrator of the MFP 101 can be easily switched by the method described in the present exemplary embodiment. Further, it is possible to provide a mechanism that can appropriately start the support service based on the contract state between the administrator and the providing source of the support service and the configuration of the image processing apparatus.

Next, a second exemplary embodiment is described.

Figure 9:
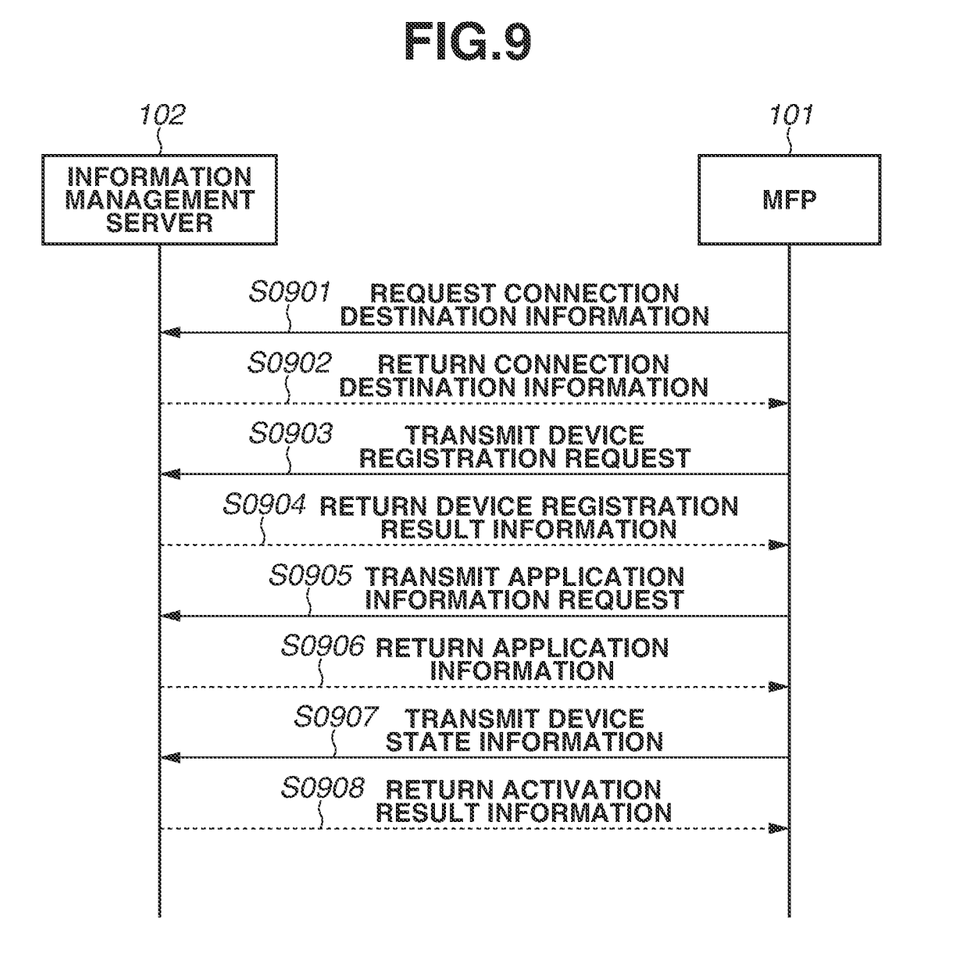
FIG. 9 illustrates a sequence for registration in the information management server according to the second exemplary embodiment.

FIG. 9 is a sequence diagram when the information relating to the MFP 101 is registered in the information management server 102 in the second exemplary embodiment.

When the MFP 101 receives an operation to connect the information management server 102, the MFP 101 requests, in step S0901, connection destination information to the information management server 102. As a response to the request for the connection destination information, the information management server 102 returns the connection destination information to the MFP 101 in step S0902. The processing in steps S0901 and S0902 are similar to the processing in steps S0601 and S0602 illustrated in FIG. 6.

In step S0903, the MFP 101 transmits device registration request to the information management server 102. The device registration request includes information for uniquely specifying a device individual, for example, a device serial number, a trade name, a shipping destination, and time zone information, and information for specifying a type of the device. When receiving the device registration request from the MFP 101, the information management server 102 returns, in step S0904, device registration result information including the printer ID of the device to the MFP 101. The processing in steps S0903 and S0904 are similar to the processing in steps S0603 and S0604 illustrated in FIG. 6.

In step S0905, the MFP 101 transmits application information request to the information management server 102. When receiving the application information request from the MFP 101, the information management server 102 returns, in step S0906, the application information associated with the printer ID of the MFP 101 to the MFP 101. There is a case where no application information is associated with the printer ID of the MFP 101 or a plurality of pieces of application information is associated with the printer ID of the MFP 101. In step S0906, the MFP 101 stores the application information transmitted from the information management server 102 into the support service setting table 207. The information to be stored in the support service setting table 207 may be a part of the application information as long as the information allows for unique identification of the registered support service in the MFP 101.

The support service setting table 207, as illustrated in FIG. 5, associates information on the support service activation setting that indicates whether to activate provision of each of one or more support services to the MFP 101, with one or more pieces of application information received by the MFP 101 in step S0906. The processing in steps S0905 and S0906 are similar to the processing in steps S0605 and S0606 illustrated in FIG. 6.

At this time, the MFP 101 determines whether to transmit the device state information based on the application information transmitted from the information management server 102.

The device state information is device information necessary to receive the support service, and the information varies depending on the type of the service.

For example, in the case of the automatic cartridge delivery service, the device state information includes information relating to the cartridge such as a cartridge type, a remaining amount, and a color of the cartridge. The data is not limited thereto, and necessary data may be determined by an optional method.

Specifically, the MFP 101 determines whether the application ID of the support service is empty, where the support service activation setting in the support service setting table 207 has been set to be valid. In a case where it is determined that the application ID of the support service set to be valid is not empty, the MFP 101 starts to transmit the device state information related to the corresponding support service to the information management server 102. The MFP 101 does not transmit the device state information, the application ID of which has been determined as being empty.

The MFP 101 may determine whether to transmit the device state information further based on determination whether the provided service matches with the MFP 101 with use of information such as the application service overview.

The device state information includes identification information such as the application ID to uniquely determine the target support service.

When receiving the device state information from the MFP 101, the information management server 102 activates the support service activation state in the application information table 308 corresponding to the identification information included in the device state information. After the information management server 102 activates the activation state in the application information table 308, the information management server 102 returns the activation result information to the MFP 101 in step S0908.

When the activation state in the application information table 308 is activated, the information management server 102 starts communication necessary for providing the service with the support service providing source.

The providing source of the support service desired by the administrator of the MFP 101 can be easily switched by the method illustrated in the present exemplary embodiment. Further, it is possible to provide the mechanism that can appropriately start the support service based on the contract state between the administrator and the providing source of the support service and the configuration of the image processing apparatus.

In the present exemplary embodiment, transmission of the device control information request from the information management server 102 becomes unnecessary. Further, the MFP 101 can transmit the device state information necessary for providing the support service to the information management server 102 without performing the transmission of the device control information request.

Accordingly, it is possible to reduce the communication traffic between the information management server 102 and the MFP 101, and to quickly start the support service desired by the user.

The exemplary embodiments of the present disclosure can be achieved by supplying software (program) achieving the functions of the above-described exemplary embodiments to a system or an apparatus through a network or a various kinds of storage media, and causing a computer (or CPU or microprocessor unit (MPU)) of the system or the apparatus to read and execute the program.

According to the exemplary embodiments of the present disclosure, it is possible to easily switch the providing source of the support service in the case where there is a plurality of providing sources of the support service with respect to one image processing apparatus. Further, it is possible to appropriately activate or deactivate the support service based on the contract state with the support service, and the configuration and presence/absence of the function of the image processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-157275, filed Aug. 24, 2018, which is hereby incorporated by reference herein in its entirety.

What is claimed is:

1. An image processing apparatus configured to communicate with an information processing apparatus that manages contract information on a service, the image processing apparatus comprising:
   a receiving unit configured to receive a user instruction for validating the service;
   an acquisition unit configured to acquire, from the information processing apparatus, the contract information on the service instructed to be valid by the received user instruction; and
   a control unit configured to control processing whether or not to start use of the service based on the contract information acquired by the acquisition unit,
   wherein the acquisition unit is configured to acquire the contract information on the service periodically.

2. The image processing apparatus according to claim 1, wherein the control unit controls the processing to start use of the service based on the contract information indicating that a user has concluded a contract to use the service.

3. The image processing apparatus according to claim 1,
   wherein the acquisition unit acquires the contract information including identification information to identify the contract for a user to use the service, in a case that a user has concluded a contract to use the service, and
   wherein the control unit performs the processing to start use of the service based on the identification information.

4. The image processing apparatus according to claim 1, wherein the service is an automatic delivery service of consumables used by the image processing apparatus for image processing.

5. The image processing apparatus according to claim 1, further comprising a storage unit configured to store a table in which information indicating whether to use each of services contracted by the image processing apparatus is associated with identification information for identifying the contract for a user to use the service.

6. The image processing apparatus according to claim 5, wherein the image processing apparatus determines whether the service is valid or invalid based on the table.

7. The image processing apparatus according to claim 1, wherein the acquisition unit acquires the contract information on the service for a user in response to a setting of the service made valid by a setting unit.

8. The image processing apparatus according to claim 1, wherein the contract information on the service is information for uniquely specifying the contract of the service.

9. The image processing apparatus according to claim 1, wherein the acquisition unit acquires the contract information on the service for a user in response to startup of the image processing apparatus.

10. The image processing apparatus according to claim 1, wherein the control unit transmits data for validating the service to the information processing apparatus based on the contract information indicating that a user has concluded a contract to use the service.

11. A method for controlling an image processing apparatus, the image processing apparatus being configured to communicate with an information processing apparatus that manages contract information on a service, the method comprising:
   receiving a user instruction for validating the service;
   acquiring, from the information processing apparatus, the contract information on the service instructed to be valid by the received user instruction; and
   controlling processing whether or not to start use of the service based on the acquired contract information relating to the service set to be valid,
   wherein the image processing apparatus is configured to acquire the contract information on the service periodically.

12. An image processing apparatus configured to communicate with an information processing apparatus that manages contract information on a service, the image processing apparatus comprising:
   a receiving unit configured to receive a user instruction for starting to use the service;
   an acquisition unit configured to acquire, from the information processing apparatus, the contract information on the service based on the user instruction; and
   a transmission unit configured to transmit a notification indicating that the image processing apparatus starts to use the service to the information processing apparatus based on the acquired contract information,
   wherein the acquisition unit is configured to acquire the contract information on the service periodically since the user instruction has been received.

13. The image processing apparatus according to claim 12, wherein the acquisition unit is configured to acquire the contract information periodically from a predetermined timing after the user instruction has been received.

14. The image processing apparatus according to claim 12, wherein the acquisition unit is configured to acquire the contract information periodically from a startup of the image processing apparatus after the user instruction has been received.

15. The image processing apparatus according to claim 12, wherein the transmission unit is configured to transmit state information of the image processing apparatus to the information processing apparatus, since the transmission unit has transmitted the notification to the information processing apparatus.

16. The image processing apparatus according to claim 12, the transmission unit configured to transmit information of a cartridge containing a recording material attached to the image processing apparatus, since the transmission unit has transmitted the notification to the information processing apparatus,
   wherein the information includes the remaining amount of the recording material contained in the cartridge.

* * * * *